US012149915B2

(12) United States Patent
Lin

(10) Patent No.: US 12,149,915 B2
(45) Date of Patent: Nov. 19, 2024

(54) SOUND EFFECT OPTIMIZATION METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Yihong Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 142 days.

(21) Appl. No.: 17/820,584

(22) Filed: Aug. 18, 2022

(65) Prior Publication Data

US 2022/0394414 A1 Dec. 8, 2022

Related U.S. Application Data

(63) Continuation of application No. PCT/CN2021/073146, filed on Jan. 21, 2021.

(30) Foreign Application Priority Data

Feb. 24, 2020 (CN) ......................... 202010113129.9

(51) Int. Cl.
*H04R 1/10* (2006.01)
*H04R 3/12* (2006.01)
(Continued)

(52) U.S. Cl.
CPC ............... *H04S 7/302* (2013.01); *H04R 3/12* (2013.01); *H04R 5/04* (2013.01); *H04S 7/303* (2013.01);
(Continued)

(58) Field of Classification Search
CPC ............................. H04S 7/302; H04S 2420/01
See application file for complete search history.

(56) References Cited

U.S. PATENT DOCUMENTS 6,181,800 B1 * 1/2001 Lambrecht .............. H04S 1/002 381/310
9,648,438 B1 5/2017 Petrov
(Continued)

FOREIGN PATENT DOCUMENTS

CN 101212843 7/2008
CN 101583064 11/2009
(Continued)

OTHER PUBLICATIONS

CNIPA, First Office Action for CN Application No. 202010113129.9, Feb. 22, 2021, 16 pages.
(Continued)

*Primary Examiner* — Ping Lee
(74) *Attorney, Agent, or Firm* — Hodgson Russ LLP

(57) ABSTRACT

A sound effect optimizing method, an electronic device, and a non-transitory computer computer-readable storage medium are provided. The method includes controlling the speaker to play an audio signal emitted by a virtual sound source; receiving a sound source identifying result, the sound source identifying result including a first position relationship, and the first position relationship being a position relationship between the virtual sound source and a user and determined by the audio signal; and adjusting a sound effect parameter until the first position relationship is consistent with a second position relationship in response to the first position relationship being inconsistent with the second position relationship, the second position relationship being an actual position relationship between the virtual sound source and the user.

18 Claims, 4 Drawing Sheets

(51) Int. Cl.
*H04R 5/04* (2006.01)
*H04S 7/00* (2006.01)

(52) U.S. Cl.
CPC ...... *H04R 2499/15* (2013.01); *H04S 2420/01* (2013.01)

(56) References Cited

U.S. PATENT DOCUMENTS

| | | | |
|---|---|---|---|
| 2010/0266133 | A1 | 10/2010 | Nakano |
| 2012/0114151 | A1 | 5/2012 | Nguyen et al. |
| 2012/0170762 | A1 | 7/2012 | Kim et al. |
| 2016/0295342 | A1 | 10/2016 | Miyasaka et al. |
| 2016/0345095 | A1* | 11/2016 | Gamper .................. H04R 3/04 |
| 2019/0261117 | A1 | 8/2019 | Norris et al. |
| 2019/0261118 | A1 | 8/2019 | Norris et al. |
| 2019/0387352 | A1 | 12/2019 | Jot et al. |
| 2020/0037097 | A1 | 1/2020 | Torres et al. |
| 2022/0322024 | A1* | 10/2022 | Subramanian ......... H04R 5/033 |

FOREIGN PATENT DOCUMENTS

| | | |
|---|---|---|
| CN | 101742378 | 6/2010 |
| CN | 103869968 | 6/2014 |
| CN | 104010265 | 8/2014 |
| CN | 104284286 | 1/2015 |
| CN | 104765038 | 7/2015 |
| CN | 104869524 | 8/2015 |
| CN | 105766000 | 7/2016 |
| CN | 105792090 | 7/2016 |
| CN | 106375911 | 2/2017 |
| CN | 106576203 | 4/2017 |
| CN | 110036655 | 7/2019 |
| CN | 110089134 | 8/2019 |
| CN | 110177328 | 8/2019 |
| CN | 110544532 | 12/2019 |
| CN | 110740415 | 1/2020 |
| CN | 110809214 | 2/2020 |
| CN | 111372167 | 7/2020 |
| JP | 2009124395 | 6/2009 |

OTHER PUBLICATIONS

CNIPA, Notification to Grant Patent Right for Invention for CN Application No. 202010113129.9, Sep. 22, 2021, 7 pages.

WIPO, International Search Report and Written Opinion for PCT/CN2021/073146, May 8, 2021, 17 pages.

Luo et al., "Sound Rendering Technology and its Application in Virtual Environment," Journal of System Simulation, Oct. 1999, vol. 11, No. 5, p. 364-p. 367.

Yu et al., "Design and validation on a multiple sound source fast measurement system of near-field head-related transfer functions," Acta Acustica, May 2017, vol. 42, No. 3, p. 348-p. 360.

* cited by examiner

SOUND EFFECT OPTIMIZATION METHOD, ELECTRONIC DEVICE, AND STORAGE MEDIUM

CROSS REFERENCE TO RELATED APPLICATIONS

The present application is a continuation of International Patent Application No. PCT/CN2021/073146, filed Jan. 21, 2021, which claims priority to Chinese Patent Application No. 202010113129.9, filed Feb. 24, 2020, the entire disclosures of which are incorporated herein by reference.

TECHNICAL FIELD

The present disclosure relates to the technical field of electronic devices, in particular to a sound effect optimizing method, an electronic device, and a storage medium.

BACKGROUND

Virtual/augmented reality devices usually emit sounds through headphones. A user may realize sound interactions through the sounds emitted by the headphones. However, in some application scenarios, the virtual/augmented reality devices may need to use speakers to emit the sounds. Since locations of the speakers in the virtual/augmented reality devices are fixed, sound sources received by the user are fixed. Immersion senses pursued by the virtual/augmented reality devices may require the sounds perceived by the user to be considered to come from a corresponding virtual location. Therefore, the virtual/augmented reality devices which emit the sounds by means of the speakers may have problems that sound simulations are not realistic enough.

It should be noted that information disclosed in the above Background is only for enhancing an understanding of the background of the present disclosure, and thus may include information which does not belong to the prior art known by those skilled in the art.

SUMMARY OF THE DISCLOSURE

A sound effect optimizing method, an electronic device, and a storage medium are provided in the embodiments of the present disclosure.

According to a first aspect of the present disclosure, a sound effect optimizing method is provided and applied in an electronic device. The electronic device includes a speaker. The method includes controlling the speaker to play an audio signal emitted by a virtual sound source; receiving a sound source identifying result, the sound source identifying result including a first position relationship, and the first position relationship being a position relationship between the virtual sound source and a user and determined by the audio signal; and adjusting a sound effect parameter until the first position relationship is consistent with a second position relationship in response to the first position relationship being inconsistent with the second position relationship. The second position relationship is an actual position relationship between the virtual sound source and the user.

According to a second aspect of the present disclosure, an electronic device is provided and includes a processor; and a memory, storing computer readable instructions. When being executed by the processor, the computer readable instructions are configured to implement the above method.

According to a third aspect of the present disclosure, a non-transitory computer-readable storage medium is provided and stores a computer program. When being executed by the processor, the computer program is configured to implement the above method.

It should be understood that general descriptions above and descriptions for details in the following are simply exemplary and explanatory, and cannot limit the present disclosure.

BRIEF DESCRIPTION OF THE DRAWINGS

Accompanying drawings herein are incorporated to specification as a part of the specification. Embodiments consistent with the present disclosure are shown in the accompanying drawings. The accompanying drawings are configured to explain a principle of the present disclosure together with the specification. Obviously, the drawings in the following description only show some embodiments of the present disclosure. Those skilled in the art may also obtain other drawings based on these drawings without creative effort.

DETAILED DESCRIPTION

Figure 1:
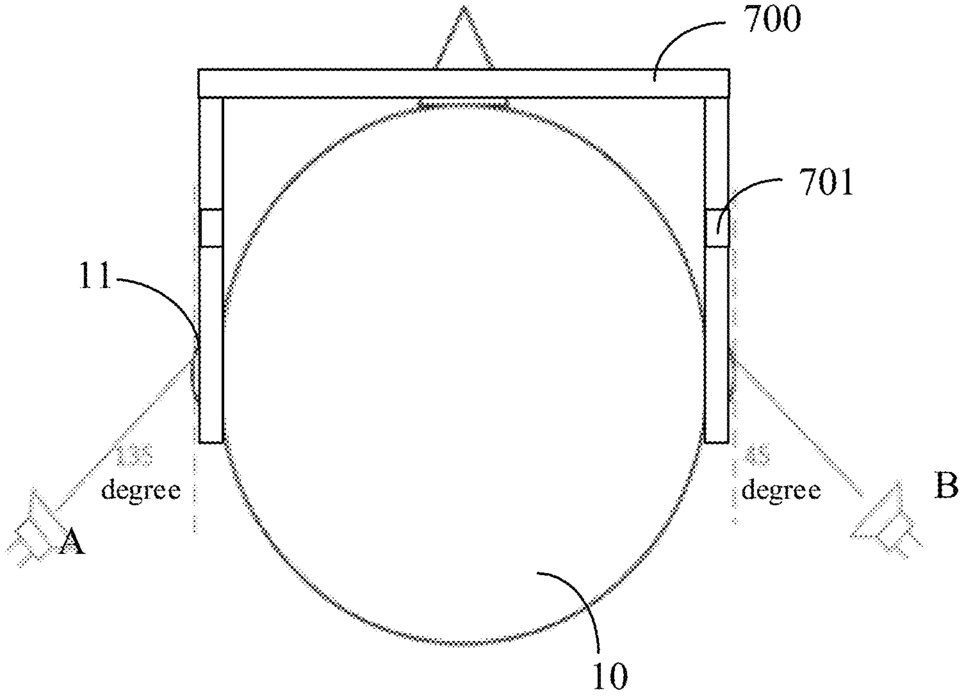
FIG. 1 is a schematic diagram of an electronic device in a wearing state according to some embodiments of the present disclosure.

Although the present disclosure may readily be embodied in different forms, only some specific embodiments are shown in the drawings and will be described in detail in specification. It can be understood that the present specification should be regarded as exemplary illustrations for a principle of the present disclosure and is not intended to limit the present disclosure to those described herein.

Thus, a reference to a feature in the specification will be configured to describe one of features in an embodiment of the present disclosure and is not to imply that each embodiment of the present disclosure has to include the feature described. Furthermore, it should be noted that multiple features are described in the specification. Although some features may be combined together to illustrate a possible system design, these features may also be configured in other combinations which are not explicitly illustrated. Thus, unless otherwise stated, the combinations described are not intended to be limitations.

The exemplary embodiments will now be described more completely with reference to the accompanying drawings. However, the exemplary embodiments may be implemented in multiple manners and should not be construed to be limited to the embodiments described herein. On the contrary, these embodiments are provided such that the present disclosure may be thorough and complete, and concepts of the exemplary embodiments may be fully conveyed to those skilled in the art. The same reference numerals in the drawings indicate the same or similar parts, and thus repeated descriptions for them will be omitted.

In a virtual reality device or an augmented reality device, an immersive experience which is consistent with a reality tend to be created. To create the immersive experience which is consistent with the reality, it is required to achieve a virtual reality or an augmented reality not only in terms of an image, but also in terms of a sound. For example, when a sound emitted in a virtual location, it is required to make the user feel like that the sound comes from the virtual location, rather than coming from the headphones.

In order to improve an authenticity of the sound in the virtual reality or the augmented reality, the virtual reality device or the augmented reality device may achieve a 3D sound effect through a head-related transfer function (HRTF).

A basic principle of a human brain determining the location of the sound source through ears will be described in the following. A human ear may include a pinna, an ear canal, and a tympanic membrane. When being sensed by an outer ear, the sound may be transferred to an eardrum through the ear canal. At this time, a back of the tympanic membrane may convert a mechanical energy to a biological energy and an electrical energy which are subsequently transmitted to a brain through a nervous system.

A sound wave may travel in air at a speed of 345 meters per second. Since a person receives the sound through both ears, a time difference may exist between a time point at which the sound source is transmitted to one of the both ears of the user and a time point at which the sound source is transmitted to the other of the both ears of the user. The time difference is referred to as Inter Aural Time Delay (ITD). For example, when a distance between the both ears of the user is 20 centimeters (cm) and the sound source is located on a left side of the user, it is undoubtable that the sound firstly arrives at a left ear of the user, and then arrives at a right ear of the user after 580 us (a time duration which is required by the sound wave for traveling 20 cm).

In a process of transmitting the sound wave, in case that the sound wave is blocked by an object, a volume of the sound heard by the user may be reduced. In response to the sound being transmitted from a direct left direction of the user, the sound sensed by the left ear of the user may reserve an original sound, while the volume of the sound sensed by the right ear of the user may be reduced due to a part of the sound being absorbed by a head of the user. An amplitude difference between an amplitude of a volume of the sound received by one of the both ears of the user and an amplitude of a volume of the sound received by the other of the both ears of the user may be referred to as Inter Aural Amplitude Difference (IAD).

When encountering the object, the sound wave may be bounced back. Human ears have substantially oval shapes with empty insides. Accordingly, sound waves having different wave lengths may generate different effects in a corresponding outer ear. In case of analyzing based on frequencies, when being transmitted from different angles, different sound resources may generate vibrations with different frequencies on the tympanic membrane. A sound transmitted from a back is completely different from a sound transmitted from a front due to a presence of the pinna.

The HRTF H(x) is a function related to a location x of a sound source, and may include parameters of ITD, IAD, and vibrations of the pinna with different frequencies. In actual applications, a HRTF library may be stored in the virtual reality device or the augmented reality device. When the 3D sound effect is enhanced, the HRTF may be called from the HRTF library based on a position of a virtual sound source and an audio output by the virtual reality device or the augmented reality device may be corrected such that authenticity of the sound effect may be enhanced.

In the related art, the virtual reality device or the augmented reality device may usually emit the sound through an earphone. Thus, a function in the HRTF library of the virtual reality device or the augmented reality device is actually configured to perform a 3D correcting process for the sound emitted by the earphone.

In some application scenarios, the virtual reality device or the augmented reality device may need to emit the sound via a speaker. Since a position of the speaker is different from a position of the earphone in use, in response to performing an auditory displaying for the audio through the function in the HRTF library, positions determined based on sound signals received by the user after sounds emitted by virtual sound sources at some certain locations are emitted out via the speaker may be different from the positions of the virtual sound sources. For example, as shown in FIG. 1, when a speaker 701 of an electronic device 700 (augmented reality glasses) is located in front of an ear 11 of a user 10, a sound emitted by a virtual sound source A located at a back of the ear of the user and a sound emitted by a virtual sound source B located at the back of the ear of the user may be incorrectly displayed as if simulated sound sources are located in front of the ear of the user in an auditory displaying process. In this way, sound-displaying authenticity may be reduced.

Figure 2:
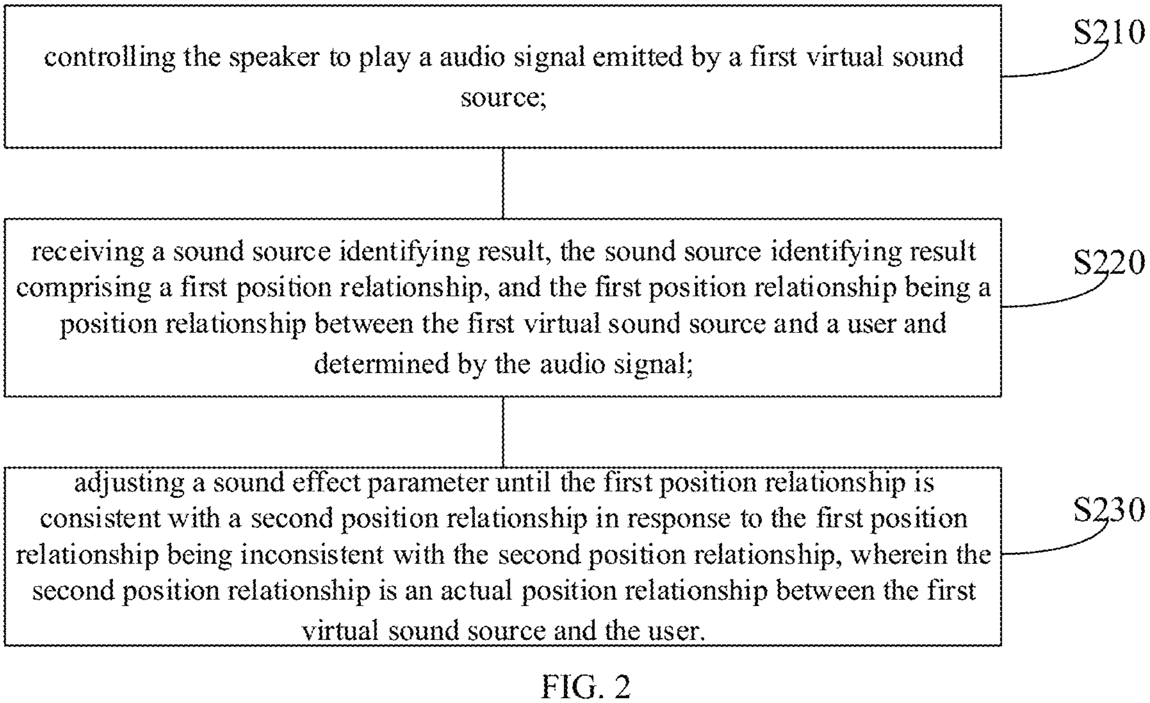
FIG. 2 is a flowchart of a first sound effect optimizing method according to some embodiments of the present disclosure.
Figure 3:
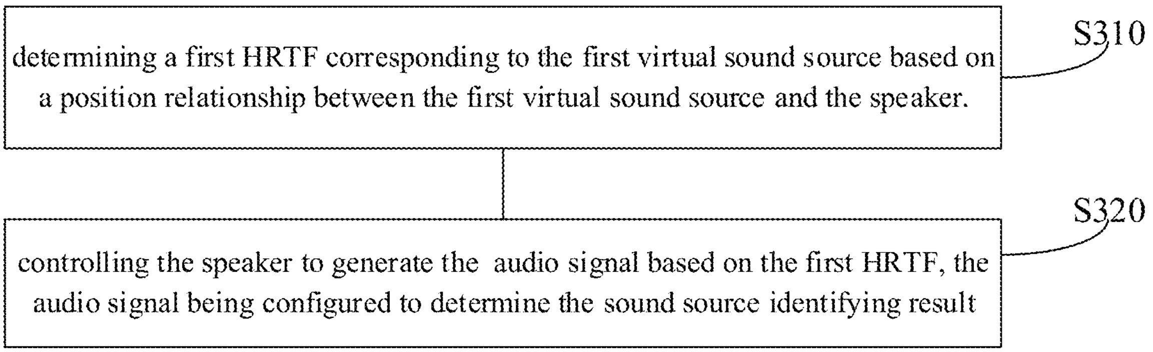
FIG. 3 is a flowchart of a second sound effect optimizing method according to some embodiments of the present disclosure.

A sound effect optimizing method is first provided in some embodiments of the present disclosure. The method may be applied for or performed by the electronic device. The electronic device may include a speaker. As shown in FIG. 2, the method may include operations executed by the following blocks.

At block S210, the speaker may be controlled or operated to play an audio signal emitted by a virtual sound source.

At block S220, a sound source identifying result is received, the sound source identifying result includes a first position relationship, and the first position relationship is a position relationship between the virtual sound source and a user and determined by the audio signal.

At block S230, a sound effect parameter may be adjusted until the first position relationship is consistent with a second position relationship in response to the first position relationship being inconsistent with the second position relationship, and the second position relationship is an actual position relationship between the virtual sound source and the user.

According to the sound effect optimizing method provided in some embodiments of the present disclosure, whether the first position relationship is consistent with the second position relationship is determined based on the sound source identifying result. In response to the first position relationship being inconsistent with the second position relationship, the sound effect parameter may be adjusted until the first position relationship is consistent with the second position relationship. In this way, the sound effect of the electronic device may be optimized, the problem that the sound simulation is not realistic enough in the virtual/augmented reality device which emits the sound through the speaker may be solved, and the personalized setting for the sound effect of the electronic device may be facilitated.

At the block S210, the speaker may be controlled to play the audio signal emitted by the virtual sound source.

In some embodiments, a first sound effect parameter may be determined based on a position relationship between the virtual sound source and the speaker. The first sound effect parameter is a sound effect parameter when the 3D correcting process is performed for the sound effect of the electronic device in an initial state.

For example, the sound effect parameter may be the parameter of the HRTF. On this basis, the block S210 may be implemented in the following manner.

At block S310, a first HRTF corresponding to the virtual sound source may be determined based on a position relationship between the virtual sound source and the speaker.

At block S320, the speaker may be controlled or operated to generate the audio signal based on the first HRTF, and the audio signal is configured to determine the sound source identifying result.

In some embodiments, the operation of determining the first HRTF corresponding to the virtual sound source based on the position relationship between the virtual sound source and the speaker may be implemented by means of: acquiring a position of the virtual sound source in a virtual environment; and selecting the first HRTF from the HRTF library based on the position of the virtual sound source. The HRTF library may be configured to store the position of the virtual sound source and a HRTF parameter corresponding to the virtual sound source in an associated way.

In the virtual reality device or the augmented reality device, each point in the virtual environment has a corresponding virtual coordinate. A coordinate point of the position of the virtual sound source may be obtained. An initial HRTF library may be stored in the electronic device. In the actual applications, an error may exist in a process of correcting audio displaying through the initial HRTF due to the position of the speaker being different from a position of the user. According to some embodiments of the present disclosure, the HRTF library may be corrected with the initial HRTF library as an initial reference, so as to optimize the sound effect of the electronic device.

A plurality of HRTFs corresponding to a plurality of virtual positions may be stored in the HRTF library. In a process of optimizing the sound effect, a corresponding HRTF may be called based on the position of the virtual sound source in the virtual environment.

In some embodiments, an operation of controlling the speaker to generate the audio signal based on the first HRTF may be implemented by means of: compensating an audio driving signal based on the first HRTF, and driving the speaker to generate the audio signal through a compensated audio driving signal.

In some embodiments, during the sound-emitting process of the speaker, a sound-emitting component may be excited by the audio driving signal, such that the speaker may emit the sound. In some embodiments of the present disclosure, the audio driving signal of the speaker may be an exciting signal corrected by the HRTF. The sound-emitting component is excited by a corrected exciting signal, such that the sound emitted by the sound-emitting component may have a 3D effect.

At the block S220, the sound source identifying result may be received, the sound source identifying result includes the first position relationship, and the first position relationship may be the position relationship determined by the audio signal and between the virtual sound source and the user.

In some embodiments, the sound source identifying result may be an orientation relationship between the virtual sound source and the user which is determined based on the audio signal after the user receives the audio signal. For example, the sound source identifying result may be that the virtual sound source is located in front of the user, behind the user, on the left of the user, or on the right of the user, or the like.

The user receiving the audio signal may be an actual user, that is, the user receiving the audio signal may be a real person wearing the electronic device having the speaker. When the electronic device is in a wearing state, relative positions of the speaker to the ears of the user are fixed. In this case, the audio signal may be played by the speaker. The user may receive the audio signal and determine a position relationship between the virtual sound source and the user himself/herself, and input the position relationship (i.e., the first position relationship) into the electronic device. The electronic device may receive the first position relationship. The orientation relationship between the virtual sound source and the user may be determined by the user subjectively determining the first position relationship.

In some embodiments, the user receiving the audio signal may be a virtual user, such as a testing machine. The testing machine may simulate a position relationship between the speaker and the user when the electronic device is in the wearing state. The speaker outputs the audio signal, and the testing machine receives the audio signal. The testing machine may have simulated human ears, and receive the audio signal through the simulated human ears. The testing machine may detect and obtain ICD, IAD, and the vibrations of the pinna with different frequencies when the audio signal of the virtual sound source is transmitted to the simulated human ears, so as to reversely acquire relative positions of a first simulated sound source to the simulated human ears (i.e., the first position relationship). The testing machine may send the first position relationship to the electronic device, and the electronic device may receive the first position relationship.

The virtual user or the real user may input the first position relationship which is determined based on the audio signal, i.e., the sound source identifying result, to the electronic device. A means of inputting to the electronic device may be by a peripheral device, such as a keyboard of the electronic device, or a touch screen, and so on.

It should be noted that the virtual sound source may be located at any sound-emitting position in a virtual image of the augmented reality device or the virtual reality device. The audio signal emitted by the virtual sound source may be corrected through the HRTF, such that the user may believe that the sound comes from the position of the virtual sound source rather than the position of the speaker when hearing the sound emitted by the virtual sound source.

At the block S230, the sound effect parameter may be adjusted until the first position relationship is consistent with the second position relationship in response to the first position relationship being inconsistent with the second position relationship. The second position relationship may be the actual position relationship between the virtual sound source and the user.

In some embodiments, the first position relationship being consistent with the second position relationship may be the first position relationship being the same with the second position relationship, or an error between the first position relationship and the second position relationship being less than a preset threshold. For example, when the virtual sound source is located in front of the user in the first position relationship, and the virtual sound source is located in front of the user in the second position relationship, it is considered that the first position relationship is consistent with the second position relationship. When the virtual sound source is located in front of the user in the first position relationship, and the virtual sound source is located behind the user in the second position relationship, it is considered that the first position relationship is inconsistent with the second position relationship.

Figure 4:
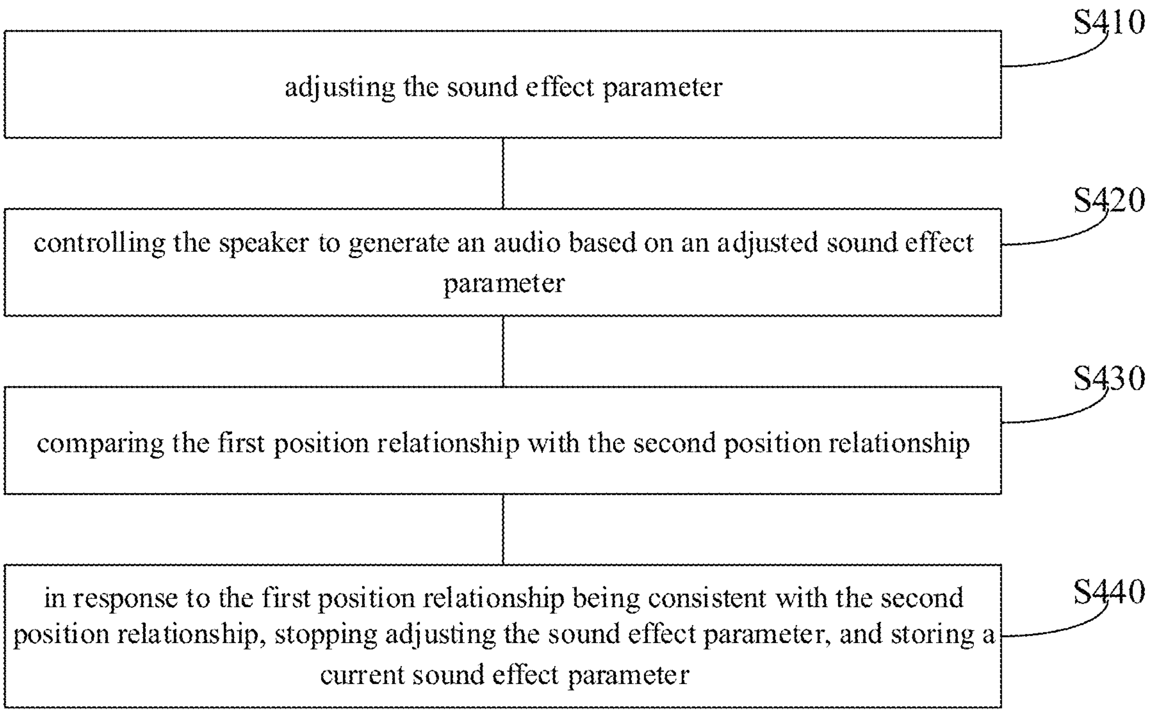
FIG. 4 is a flowchart of a third sound effect optimizing method according to some embodiments of the present disclosure.

At the block S230, as shown in FIG. 4, the adjusting a sound effect parameter until the first position relationship is consistent with a second position relationship may be implemented by the following operations.

At block S410, the sound effect parameter may be adjusted.

At block S420, the speaker may be controlled to generate an audio based on an adjusted sound effect parameter.

At block S430, the first position relationship may be compared with the second position relationship.

At block S440, in response to the first position relationship being consistent with the second position relationship, adjusting the sound effect parameter may be stopped, and a current sound effect parameter may be stored.

In some embodiments, the sound effect parameter may be a parameter of the first HRTF. The parameters of HRTF may include one or more of the ITD, the IAD, and the vibrations of the pinna with different frequencies. On this basis, the block S410 may include adjusting the parameters of the first HRTF.

Adjusting the parameters of the first HRTF may be performed in a random way or in a trial-and-error way. That is, the parameters of HRTF may be adjusted in a certain direction. In response to failing to obtain a target result after adjusting multiple times in the certain direction, the direction may be adjusted and the parameters of HRTF may be adjusted in the adjusted direction, and a test may be continued. For example, the ITD and the IAD may be increased at the same time, or the ITD and the IAD may be reduced at the same time, or the ITD may be reduced and the IAD may be increased at the same time, or the like.

Or adjusting the parameters of the first HRTF may be performed in a goal-oriented way. It may be determined whether to increase the parameters of the first HRTF or reduce the parameters of the first HRTF based on the positions of the speaker and the user relative to each other and the position of the virtual sound source when the electronic device is in the wearing state. Subsequently, the parameters of the first HRTF may be adjusted based on this rule.

The block S420 may include an operation of controlling the speaker to generate the audio based on an adjusted first HRTF.

In some embodiments, after the parameters of the first HRTF are adjusted, the speaker may be controlled to emit the sound based on the adjusted first HRTF. The user receives the audio output by the speaker and determine the position relationship (the first position relationship) between the first virtual sound resource and the user based on the audio.

The block S430 may include an operation of comparing the first position relationship with the second position relationship.

Comparing the first position relationship with the second position relationship may means determining whether the first position relationship is consistent with the second position relationship.

The first position relationship may be a position relationship between the virtual sound source and the user and determined by the audio signal. The second position relationship may be an actual position relationship between the virtual sound source and the user.

The block S440 may include: in response to the first position relationship being consistent with the second position relationship, stopping adjusting the parameters of the first HRTF, and storing a parameter of the current first HRTF.

The blocks S410 to S440 may be executed cyclically. In response to the first position relationship being consistent with the second position relationship, adjusting the parameter of the first HRTF may be stopped, and the parameter of the current first HRTF. In response to the first position relationship being inconsistent with the second position relationship, go to the block S410.

When the first position relationship is consistent with the second position relationship, a current HRTF may be recorded as a second HRTF. In this case, the first HRTF in the electronic device may be updated to the second HRTF, so as to optimize the sound effect of the electronic device. Parameters of the second HRTF may be the parameters of the HRTF in case that the first position relationship is consistent with the second position relationship.

When the first position relationship is consistent with the second position relationship, it is considered that the sound emitted by the electronic device is close to the reality. Therefore, updating the first HRTF to the second HRTF may increase the authenticity of the sound emitted by the electronic device. That is, the parameters of the HRTF in the HRTF library and corresponding to the virtual sound source may be updated to parameters which may allow or enable the first position relationship to be consistent with the second position relationship.

In some embodiments, in order to increase the authenticity of the sound emitted by the electronic device, the sound effect optimizing method provided by some embodiments of the present disclosure may further include a following operation of performing an enhancing process for a library of the sound effect parameter, and obtaining an enhanced library of the sound effect parameter.

In some embodiment, when the sound effect parameter includes the parameter of the HRTF, the enhancing process may be performed for the HRTF library and an enhanced HRTF library may be obtained. The enhancing process may be performed before the block S210, in this case, the first HRTF may be called from the enhanced HRTF library.

In some embodiments, during performing the enhancing process for the HRTF library, a linear enhancing process may be performed for the HRTF based on the position relationship between the speaker and the user. For example, all functions in the HRTF library may be amplified several times, an enhancing constant may be superimposed on the functions in the HRTF library, or the like.

In some embodiments, in order to enhance the authenticity of the sound emitted by the electronic device, the sound effect optimizing method provided in some embodiments of the present disclosure may further include a following operation of determining a first position parameter from the speaker to an ear of the user based on the position relationship between the speaker and the user, and correcting the sound effect parameter based on the first position parameter.

In some embodiments, when the sound effect parameter includes the parameter of the HRTF, a first audio transmitting function from the speaker to the ear of the user may be determined based on the position relationship between the speaker and the user, and the first HRTF may be corrected through the first audio transmitting function. This operation may be performed before the block S210, and in this case, the first HRTF may be called from a corrected HRTF library.

In some embodiments, when the first HRTF is corrected through the first audio transmitting function, the first audio transmitting function and the first HRTF may be superimposed or added in response to the virtual sound source and the speaker being located on the same side of the user; and the first HRTF and the first audio transmitting function may be subtracted from each other in response to the virtual sound source being located on a side of the user different from a side of the user where the speaker is located. In the actual applications, the first HRTF may be corrected by means of convolution, etc., which is not a limitation to the embodiments of the present disclosure.

It is worth noting that the authenticity of the sound emitted by the electronic device in fact may be reduced only in certain directions due to the relative position of the speaker to the user being fixed when the speaker is in use in the actual applications. In this case, the HRTF is simply required to be updated at a specific position. As shown in FIG. 1, when the speaker is located in front of the ears of the user, the virtual sound source behind the user may have a reduced authenticity. In this case, some virtual sound source points may be selected only from the back of the user for testing and the parameters of the HRTF may be updated. In order to reduce workload of testing and updating, after testing some virtual sound source points, parameters of HRTF of remaining points may be obtained by performing mathematically calculating processes for the remaining points based on testing values.

In some embodiments, as shown in FIG. 1, the speaker of the augmented reality glasses is located in front of the ears of the user when the glasses are worn, the position of the virtual sound source may be selected from the virtual environment behind the user for testing. For example, a position A on a 45-degree line behind the user and a position B on a 135-degree line behind the user may be selected.

According to the sound effect optimizing method provided in some embodiments of the present disclosure, whether the first position relationship is consistent with the second position relationship is determined based on the sound source identifying result. In response to the first position relationship being inconsistent with the second position relationship, the sound effect parameter may be adjusted until the first position relationship is consistent with the second position relationship. In this way, the sound effect of the electronic device may be optimized, the problem that the sound simulation is not realistic enough in the virtual/augmented reality device which emits the sound through the speaker may be solved, and the personalized setting for the sound effect of the electronic device may be facilitated.

It should be noted that various operations of the method in the embodiments of the present disclosure are described in a particular sequence in the accompanying drawings, however, it does not require or imply that these operations have to be implemented in the particular sequence, or that a desired result is achieved only when all operations shown are implemented. Additionally, or alternatively, some operations may be omitted, multiple operations may be combined to one operation to implement, and/or one operation may be divided into multiple operations to implement.

Figure 5:
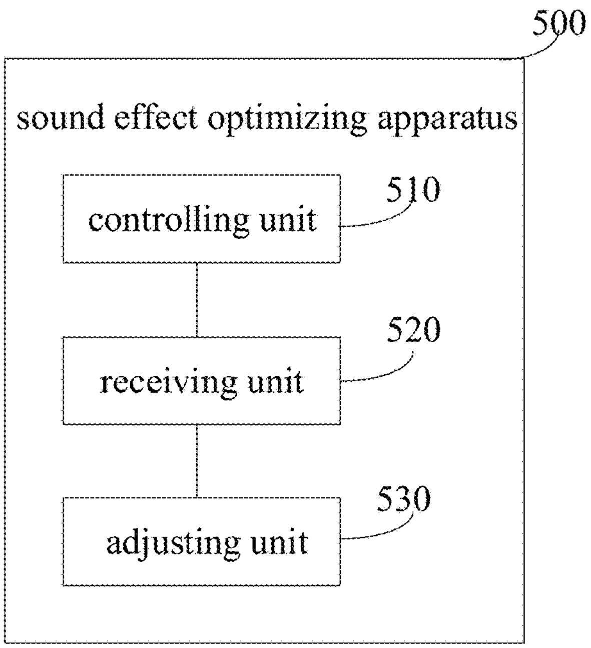
FIG. 5 is a block diagram of a sound effect optimizing apparatus according to some embodiments of the present disclosure.

A sound effect optimizing apparatus 500 is further provided in some embodiments of the present disclosure. The sound effect optimizing apparatus 500 is applied in the electronic device. The electronic device may include the speaker. As shown in FIG. 5, the sound effect optimizing apparatus 500 may include the following.

A controlling unit 510 is configured to control the speaker to play an audio signal generated by a virtual sound source.

A receiving unit 520 is configured to receive a sound source identifying result, the sound source identifying result includes a first position relationship, and the first position relationship is a position relationship between the virtual sound source and a user and determined by the audio signal.

An adjusting unit 530 is configured to adjust a sound effect parameter until the first position relationship is consistent with a second position relationship in response to the first position relationship being inconsistent with the second position relationship. The second position relationship is an actual position relationship between the virtual sound source and the user.

Specific details of each unit of the sound effect optimizing apparatus in the above have been described in detail in the sound effect optimizing method, which will not be repeated herein.

According to the sound effect optimizing apparatus provided in some embodiments of the present disclosure, whether the first position relationship is consistent with the second position relationship is determined based on the sound source identifying result. In response to the first position relationship being inconsistent with the second position relationship, the parameter of the first HRTF may be adjusted until the first position relationship is consistent with the second position relationship. The first HRTF may be updated to the second HRTF. A parameter of the second HRTF may be the parameter of the HRTF when the first position relationship is consistent with the second position relationship. In this way, the sound effect of the electronic device may be optimized, and the problem that the sound simulation is not realistic enough in the virtual/augmented reality device which emits the sound through the speaker may be solved.

In some embodiments, the sound effect optimizing apparatus may further include a first determining unit and a second controlling unit.

The first determining unit may be configured to determine a first sound effect parameter corresponding to the virtual sound source based on a position relationship between the virtual sound source and the speaker.

The second controlling unit may be configured to control the speaker to generate the audio signal based on the first sound effect parameter. The audio signal is configured to determine the sound source identifying result.

In some embodiments, the first determining unit may include a first acquiring subunit and a first selecting unit.

The first acquiring subunit may be configured to acquire a position of the virtual sound source in a virtual environment.

The first selecting unit may be configured to select a first HRTF from a library of the sound effect parameter based on the position of the virtual sound source. The HRTF library may be configured to store a position of a virtual sound source and the sound effect parameter corresponding to the virtual sound source in an associated way.

In some embodiments, the sound effect optimizing apparatus may include an enhancing unit. The enhancing unit may be configured to perform an enhancing process for the library of the sound effect parameter, and obtain an enhanced library of the sound effect parameter.

In some embodiments, the enhancing unit may include a enhancing subunit.

The enhancing subunit may be configured to perform a linear enhancing process for the sound effect parameter based on a position relationship between the speaker and the user.

In some embodiments, the adjusting unit may include a first adjusting subunit, a first controlling subunit, a comparing subunit, and a storing subunit.

The first adjusting subunit may be configured to adjust the sound effect parameter.

The first controlling subunit may be configured to control the speaker to generate an audio based on an adjusted sound effect parameter.

The comparing subunit may be configured to compare the first position relationship with the second position relationship.

The storing subunit may be configured to stop adjusting the sound effect parameter and store a current sound effect parameter in response to the first position relationship being consistent with the second position relationship.

In some embodiments, the sound effect optimizing apparatus may further include a second determining unit and a correcting unit.

The second determining unit may be configured to determine a first position parameter from the speaker to an ear of the user based on the position relationship between the speaker and the user.

The correcting unit may be configured to correct the sound effect parameter based on the first position parameter.

In some embodiments, the correcting unit may include a superimposing subunit and a subtracting subunit.

The superimposing subunit may be configured to superimpose the first position parameter and the sound effect parameter, in response to the virtual sound source and the speaker being located on the same side of the user.

The subtracting subunit may be configured to subtract the first position parameter and the sound effect parameter from each other, in response to the virtual sound source being located on a side of the user different from a side of the user where the speaker is located.

It should be noted that although some modules or units of the sound effect optimizing apparatus are described in the above detailed description, such division is not mandatory. In fact, according to some embodiments of the present disclosure, features and functions of two or more modules or units described above may be embodied in one module or unit. On the contrary, the features and the functions of one module or unit described above may be further divided into multiple modules or units to be embodied.

An electronic device able to implement the method described above is provided in some embodiments of the present disclosure. The electronic device may be the virtual reality device or the augmented reality device.

Those skilled in the art may understand that each aspect of the present disclosure may be implemented as a system, a method, or a program product. Therefore, each aspect of the present disclosure may be specifically implemented in a form of a complete hardware embodiment, a complete software embodiment (including a firmware, a microcode, etc.), or an embodiment of a combination of a hardware aspect and a software aspect, which may be collectively referred to as a "circuit", a "module" or a "system" herein.

An electronic device 600 according to some embodiments of the present disclosure is described with reference to FIG. 6 in the following. The electronic device 600 shown in FIG. 6 is simply an example, which is not supposed to bring any limitation to the functions and applying scopes of the embodiments of the present disclosure.

Figure 6:
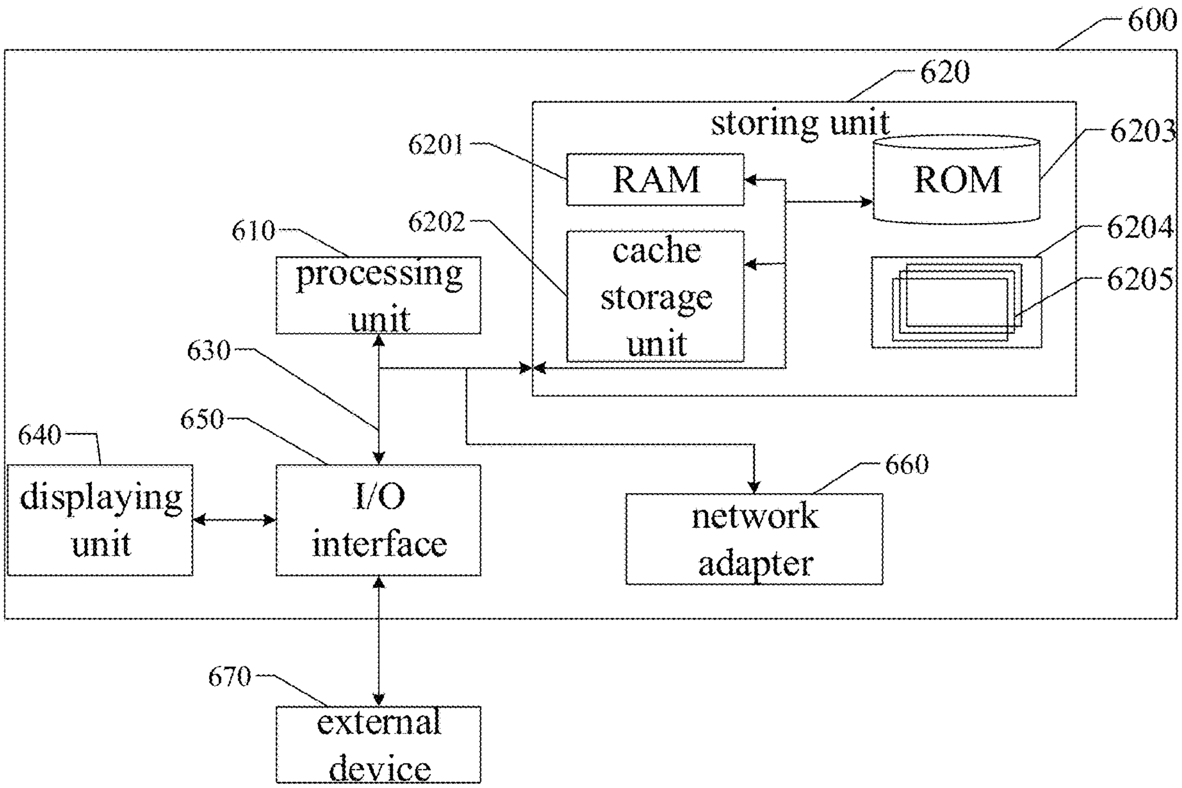
FIG. 6 is a schematic diagram of the electronic device according to according to some embodiments of the present disclosure.

As shown in FIG. 6, the electronic device 600 may embody in a form of a general-purpose computing device. Components of the electronic device 600 may include but are not limited to at least one processing unit 610 described above, at least one storing unit 620 described above, a bus 630 connecting different system components (including the storing unit 620 and the processing unit 610), and a displaying unit 640.

In some embodiments, the storing unit may store program codes. The program codes may be executed by the processing unit 610, such that the processing unit 610 may implement operations according to each embodiment of the present disclosure which is described in a part of "an exemplary method" above in the specification.

The storing unit 620 may include a readable medium in a form of a volatile storage unit, such as a random access storage unit (a random access memory, RAM) 6201 and/or a cache storage unit 6202, and may further include a read only storage unit (a read only memory, ROM) 6203.

The storing unit 620 may also include a program/utility tool 6204 having a group of (one or more) program modules 6205. Such program modules 6205 may include but be not limited to an operating system, one or more application programs, other program modules, and program data. Each of or a certain combination of these embodiments may include an implementation of a network environment.

The bus 630 may represent one or more of some types of bus structures, and may include a storing unit bus or a storing unit controller, a peripheral bus, a graphics accelerating port, the processing unit, or a local area bus using any of multiple types of bus structures.

The electronic device 600 may also communicate with one or more external devices 670 (e.g., keyboards, pointing devices, Bluetooth devices, etc.), or one or more devices which may enable the user to interact with the electronic device 600, and/or any device (e.g., a router, a modem, etc.) which may enable the electronic device 600 to communicate with one or more other computing devices. The communication may be performed through an input/output (I/O) interface 650. In addition, the electronic device 600 may communicate with one or more networks (e.g., a local area network (LAN), a wide area network (WAN), and/or a public network such as the Internet) by means of a network adapter 660. As shown in FIG. 6, the network adapter 640 communicates with other modules of electronic device 600 via the bus 630. It should be appreciated that, although not shown in the drawings, other hardware and/or software modules may be applied in conjunction with electronic device 600. The other hardware and/or software modules may include but be not limited to microcode, device drivers, redundant processing units, external disk drive arrays, RAID systems, tape drives, and data backup storage systems, and the like.

According to descriptions for the above embodiments, those skilled in the art may easily understand that the embodiments described herein may be implemented by means of a software, or may be implemented by means of the software being combined with a necessary hardware. Therefore, the technical solutions according to the embodiments of the present disclosure may be embodied in a form of a software product. The software product may be stored in a non-volatile storage medium (which may be a CD-ROM, a U disk, a mobile hard disk, etc.) or on the network, and include some instructions to cause a computing device (which may be a personal computer, a server, a terminal device, or a network device, etc.) to execute the method according to embodiments of the present disclosure.

It should be noted that the electronic device provided by the embodiments of the present disclosure may be a head-mounted device, such as glasses or a helmet. The speaker is arranged on the glasses or the helmet. Since head shapes or positions of ears of users may vary during a use of the electronic device, the electronic device according to the embodiments of the present disclosure may not only be configured to optimize the sound effect of the virtual reality device or the augmented reality device, but also be configured to the personalized setting for the sound effect of the electronic device performed by different users.

A non-transitory computer-readable storage medium is further provided in the embodiments of the present disclosure and stores a program product which is able to implement the above method in the specification. In some embodiments, each aspect of the present disclosure may be implemented in a form of the program product which may include the program codes. The program codes are configured to cause the terminal device to implement the operations according to each embodiment of the present disclosure which is described in the part of "the exemplary method" above in the specification.

Figure 7:
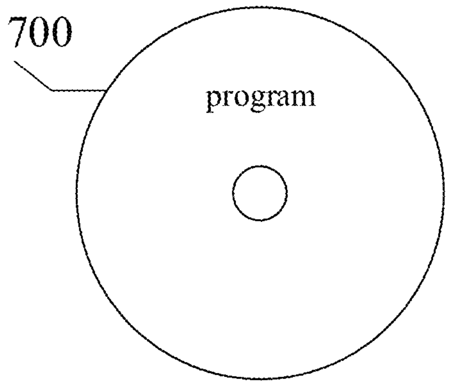
FIG. 7 is a schematic diagram of a non-transitory computer-readable storage medium according to according to some embodiments of the present disclosure.

As shown in FIG. 7, a program product 700 for implementing the above method according to embodiments of the present disclosure is described. The program product 700 may adopt a portable compact disk read only memory (CD-ROM), include the program codes, and be run on the terminal device such as a personal computer. However, the program product of the present disclosure is not limited thereto. In this document, the readable storage medium may be any tangible medium which may include or store a program, and the program may be used by or in conjunction with an instruction-executing system, an instruction-executing device, or an instruction-executing component.

The program product may adopt any combination of one or more readable media. The readable medium may be a readable signal medium or a readable storage medium. The readable storage medium for example, may be but not limited to an electrical system, device or component, a magnetic system, device or component, an optical system, device or component, an electromagnetic system, device or component, an infrared system, device or component, or a semiconductor system, device or component, or a combination of any of the above. More specific examples (a non-exhaustive list) of the readable storage medium may include an electrical connection with one or more wires, a portable disk, a hard disk, the RAM, the ROM, an erasable programmable read only memory (EPROM or a flash memory), an optical fiber, the CD-ROM, an optical storage component, a magnetic storage component, or any suitable combination of the above.

A computer readable signal medium may include a data signal spread in a base band or as a part of carrier wave. The data signal may carry readable program codes. The data signal which is spread may adopt multiple forms including but being not limited to an electromagnetic signal, an optical signal, or any suitable combination of the above. The readable signal medium may also be any readable medium besides the readable storage medium, which may transmit, spread, or transport the program which may be used by or in conjunction with the instruction-executing system, the instruction-executing device, or the instruction-executing component.

The program codes stored in the storage medium may be transmitted by means of any suitable medium, which may include but not be limited to a wireless way, a wire way, an optical fiber cable, RF, etc., or any suitable combination of the above.

The program codes configured for implementing the operations of the present disclosure may be written in any combination of one or more programming languages. The programming languages may include an object-oriented programming language such as Java, C++, etc., and a conventional procedural programming Language such as a "C" language or a similar programming language. The program codes may be executed entirely or partly on the computing device of the user, or executed as a stand-alone software package, or partly executed on the computing device of the user and partly executed on a remote computing device, or executed entirely on the remote computing device or the server. In a case involving the remote computing device, the remote computing device may be connected to the computing device of the user by means of any kind of network including LAN and WLAN, or connected to an outer computing device (for example, connecting by means of an Internet provided by an Internet service provider).

Furthermore, the above drawings are merely schematic illustrations for processes in the method according to the embodiments of the present disclosure, and are not intended to be any limitation. It is readily to understand that the processes shown in the above drawings do not indicate or limit a chronological order of these processes. In addition, it is also readily understood that these processes for example, may be performed synchronously or asynchronously in multiple modules.

After those skilled in the art consider specification and practice the present disclosure, other embodiments of the present disclosure will be readily obtained. The present disclosure is intended to cover any variation, application, or adaptive change of the present disclosure. These variations, applications, or adaptive changes follow a general principle of the present disclosure and include common knowledge or common technical means in the technical field which are not disclosed in the present disclosure. The specification and embodiments are simply regarded to be exemplary. A true scope and a spirit of the present disclosure are indicated by claims.

It should be understood that the present disclosure is not limited to precise structures described above and illustrated in the accompanying drawings, and that various modifications and changes may be made without departing from a scope of the present disclosure. The scope of the present disclosure is simply limited by the appended claims.

What is claimed is:

1. A sound effect optimizing method, performed by an electronic device, the electronic device comprising a speaker, and the method comprising:

controlling the speaker to play an audio signal emitted by a virtual sound source;

receiving a sound source identifying result, the sound source identifying result comprising a first position relationship, and the first position relationship being a position relationship between the virtual sound source and a user and determined by the audio signal; and adjusting a sound effect parameter until the first position relationship is consistent with a second position relationship in response to the first position relationship being inconsistent with the second position relationship, wherein the second position relationship is an actual position relationship between the virtual sound source and the user;

wherein the method further comprises:

wherein the correcting the sound effect parameter based on the first position parameter, comprises:

superimposing the first position parameter and the sound effect parameter, in response to the virtual sound source and the speaker being located on a same side of the user; and subtracting the first position parameter and the sound effect parameter from each other, in response to the virtual sound source being located on a side of the user different from a side of the user where the speaker is located.

2. The sound effect optimizing method according to claim 1, further comprising:

determining a first sound effect parameter corresponding to the virtual sound source based on a position relationship between the virtual sound source and the speaker; and controlling the speaker to generate the audio signal based on the first sound effect parameter, wherein the audio signal is configured to determine the sound source identifying result.

3. The sound effect optimizing method according to claim 2, wherein the first sound effect parameter is a sound effect parameter in response to performing a 3D correcting process for the sound effect of the electronic device in an initial state.

4. The sound effect optimizing method according to claim 2, wherein the determining a first sound effect parameter corresponding to the virtual sound source based on a position relationship between the virtual sound source and the speaker, comprises:

acquiring a position of the virtual sound source in a virtual environment; and selecting a first head-related transfer function (HRTF) from a library of the sound effect parameter based on the position of the virtual sound source, wherein the library of the sound effect parameter is configured to store a position of the virtual sound source and the sound effect parameter corresponding to the virtual sound source in an associated way.

5. The sound effect optimizing method according to claim 4, further comprising:

performing an enhancing process for the library of the sound effect parameter, and obtaining an enhanced library of the sound effect parameter.

6. The sound effect optimizing method according to claim 5, wherein the performing an enhancing process for the library of the sound effect parameter, comprises:

performing a linear enhancing process for the sound effect parameter based on a position relationship between the speaker and the user.

7. The sound effect optimizing method according to claim 6, further comprising:

recording a current HRTF as a second HRTF in response to the first position relationship being consistent with the second position relationship; and updating a first HRTF to the second HRTF;

wherein parameters of the second HRTF are parameters of HRTF in response to the first position relationship being consistent with the second position relationship.

8. The sound effect optimizing method according to claim 1, wherein the adjusting a sound effect parameter until the first position relationship is consistent with the second position relationship, comprises:

adjusting the sound effect parameter;

controlling the speaker to generate an audio based on an adjusted sound effect parameter;

comparing the first position relationship with the second position relationship; and in response to the first position relationship being consistent with the second position relationship, stopping adjusting the sound effect parameter, and storing a current sound effect parameter.

9. The sound effect optimizing method according to claim 1, wherein the sound effect parameter comprises a parameter of HRTF;

wherein the controlling the speaker to play the audio signal emitted by a first virtual sound source, comprises:

determining a first HRTF corresponding to the virtual sound source based on a position relationship between the virtual sound source and the speaker; and controlling the speaker to generate the audio signal based on the first HRTF, wherein the audio signal is configured to determine the sound source identifying result.

10. The sound effect optimizing method according to claim 9, wherein the parameter of HRTF comprises an Inter Aural Time Delay (ITD), an Inter Aural Amplitude Difference (IAD), and vibrations of a pinna with different frequencies.

11. The sound effect optimizing method according to claim 9, wherein the controlling the speaker to generate the audio signal based on the first HRTF, comprises:

compensating an audio driving signal based on the first HRTF; and driving the speaker to generate the audio signal through a compensated audio driving signal.

12. The sound effect optimizing method according to claim 9, wherein the first position relationship being consistent with a second position relationship comprises:

the first position relationship being the same with the second position relationship; or an error between the first position relationship and the second position relationship being less than a preset threshold.

13. An electronic device, comprising:

a processor; and a memory, storing computer readable instructions; wherein when being executed by the processor, the computer readable instructions are configured to implement:

controlling a speaker to play an audio signal emitted by a virtual sound source;

receiving a sound source identifying result, the sound source identifying result comprising a first position relationship, and the first position relationship being a position relationship between the virtual sound source and a user and determined by the audio signal; and adjusting a sound effect parameter until the first position relationship is consistent with a second position relationship in response to the first position relationship being inconsistent with the second position relationship, wherein the second position relationship is an actual position relationship between the virtual sound source and the user;

wherein the computer readable instructions are further configured to implement:

determining a first position parameter from the speaker to an ear of the user based on a position relationship between the speaker and the user; and correcting the sound effect parameter based on the first position parameter; and wherein the correcting the sound effect parameter based on the first position parameter, comprises:

superimposing the first position parameter and the sound effect parameter, in response to the virtual sound source and the speaker being located on a same side of the user; and subtracting the first position parameter and the sound effect parameter from each other, in response to the virtual sound source being located on a side of the user different from a side of the user where the speaker is located.

14. The electronic device according to claim 13, wherein the computer readable instructions are further configured to implement:

determining a first sound effect parameter corresponding to the virtual sound source based on a position relationship between the virtual sound source and the speaker; and controlling the speaker to generate the audio signal based on the first sound effect parameter, wherein the audio signal is configured to determine the sound source identifying result.

15. The electronic device according to claim 13, wherein in the determining a first sound effect parameter corresponding to the virtual sound source based on a position relationship between the virtual sound source and the speaker, the computer readable instructions are further configured to implement:

acquiring a position of the virtual sound source in a virtual environment; and selecting a first HRTF from a library of the sound effect parameter based on the position of the virtual sound source, wherein the library of the sound effect parameter is configured to store a position of the virtual sound source and the sound effect parameter corresponding to the virtual sound source in an associated way.

16. A non-transitory computer-readable storage medium, storing a computer program, wherein when being executed by a processor, the computer program is configured to perform steps, including:

controlling a speaker to play an audio signal emitted by a virtual sound source;

receiving a sound source identifying result, the sound source identifying result comprising a first position relationship, and the first position relationship being a position relationship between the virtual sound source and a user and determined by the audio signal; and adjusting a sound effect parameter until the first position relationship is consistent with a second position relationship in response to the first position relationship being inconsistent with the second position relationship, wherein the second position relationship is an actual position relationship between the virtual sound source and the user;

wherein the computer program is configured to implement:

determining a first position parameter from the speaker to an ear of the user based on a position relationship between the speaker and the user; and correcting the sound effect parameter based on the first position parameter; and wherein the correcting the sound effect parameter based on the first position parameter, comprises:

superimposing the first position parameter and the sound effect parameter, in response to the virtual sound source and the speaker being located on a same side of the user; and subtracting the first position parameter and the sound effect parameter from each other, in response to the virtual sound source being located on a side of the user different from a side of the user where the speaker is located.

17. The non-transitory computer-readable storage medium according to claim 16, wherein the computer program is configured to implement:

determining a first sound effect parameter corresponding to the virtual sound source based on a position relationship between the virtual sound source and the speaker; and controlling the speaker to generate the audio signal based on the first sound effect parameter, wherein the audio signal is configured to determine the sound source identifying result.

18. The non-transitory computer-readable storage medium according to claim 16, wherein in the determining a first sound effect parameter corresponding to the virtual sound source based on a position relationship between the virtual sound source and the speaker, the computer program is configured to implement:

acquiring a position of the virtual sound source in a virtual environment; and selecting a first HRTF from a library of the sound effect parameter based on the position of the virtual sound source, wherein the library of the sound effect parameter is configured to store a position of the virtual sound source and the sound effect parameter corresponding to the virtual sound source in an associated way.

* * * * *